Figure 1:
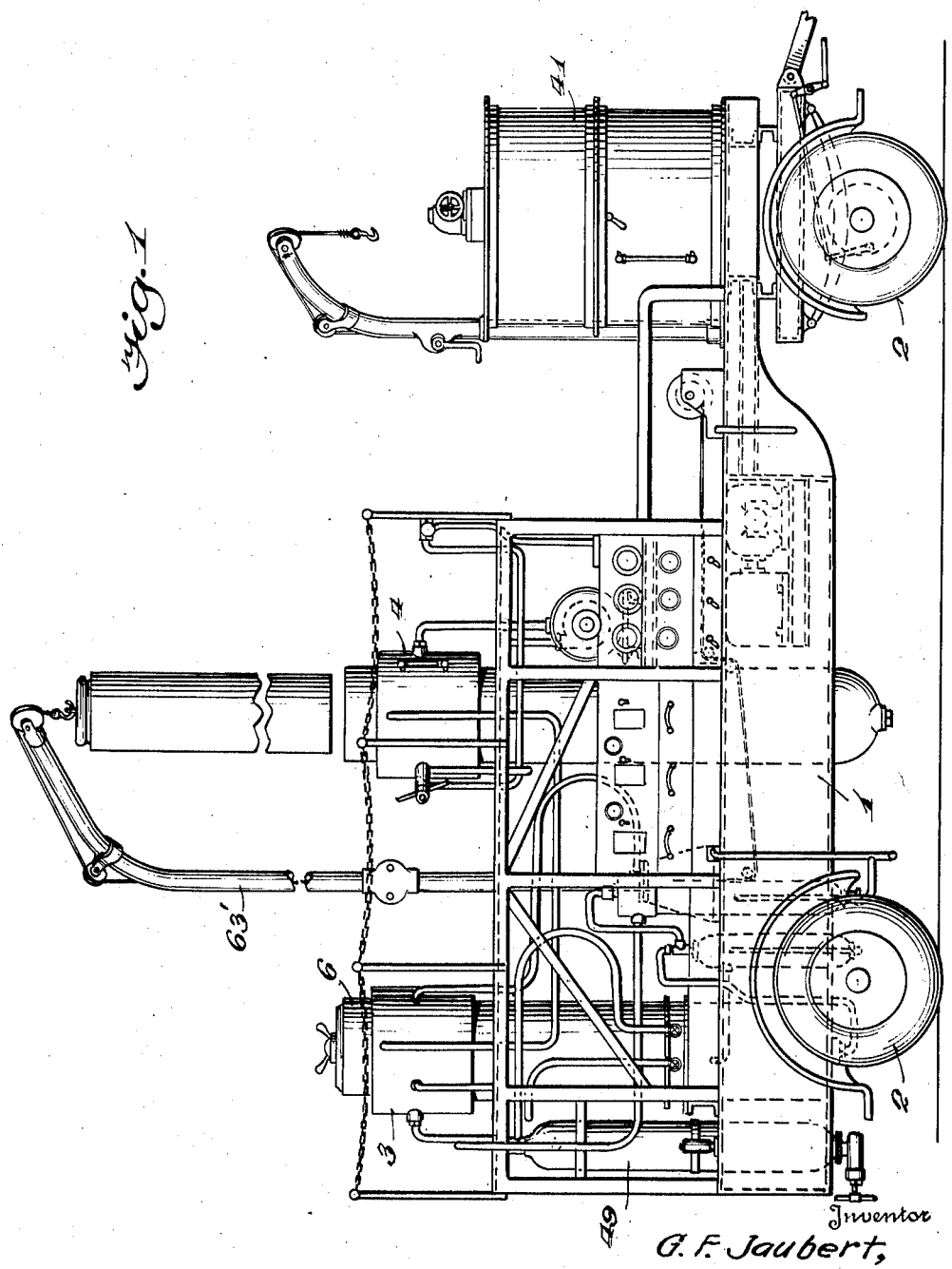

Oct. 26, 1943.　　　　G. F. JAUBERT　　　　2,332,915
PLANT FOR THE PREPARATION OF HYDROGEN UNDER PRESSURE
Filed March 12, 1940　　　　5 Sheets-Sheet 1

Oct. 26, 1943.   G. F. JAUBERT   2,332,915
PLANT FOR THE PREPARATION OF HYDROGEN UNDER PRESSURE
Filed March 12, 1940   5 Sheets-Sheet 2

Inventor
G. F. Jaubert,
By Alex Holcombe
Attorney.

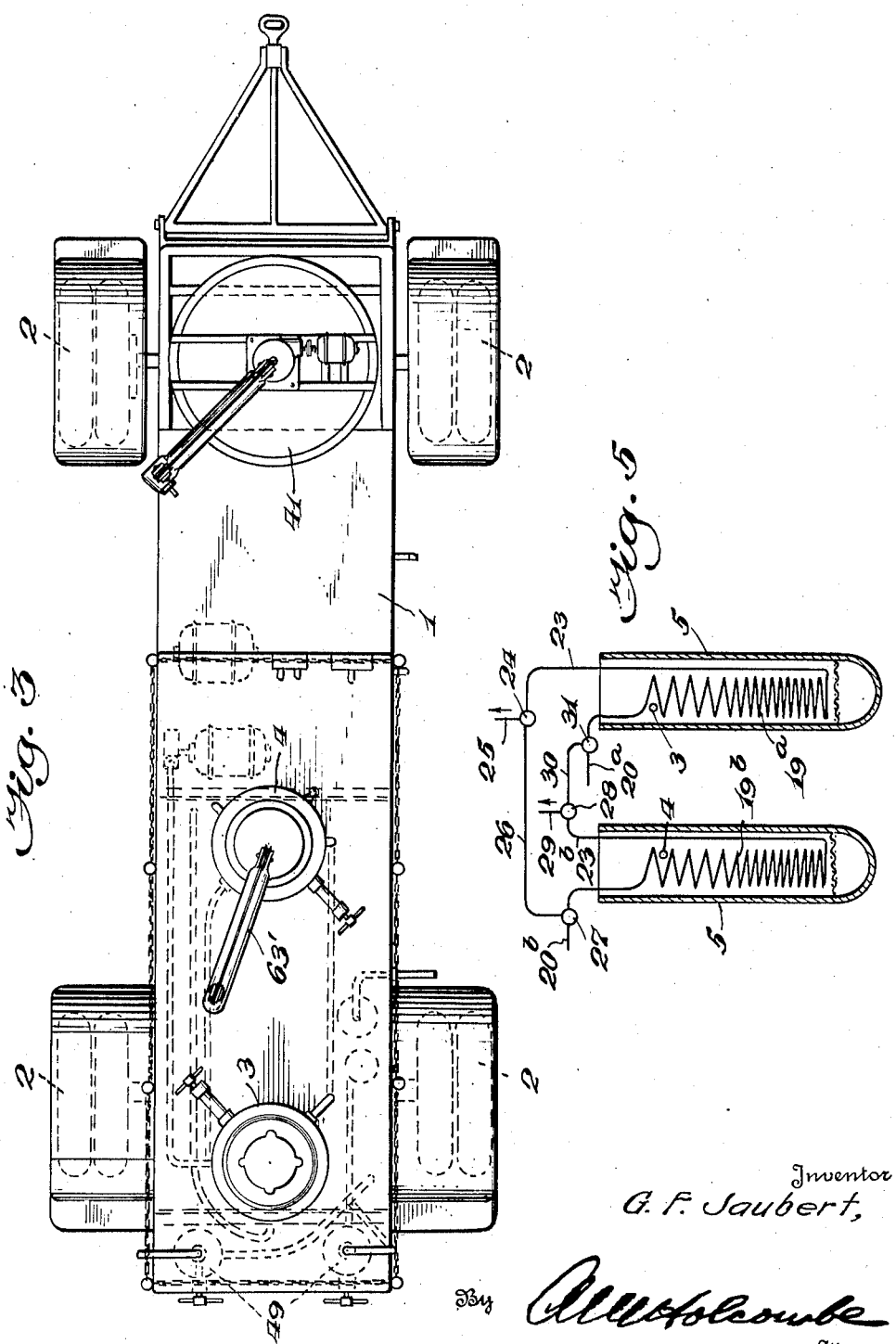

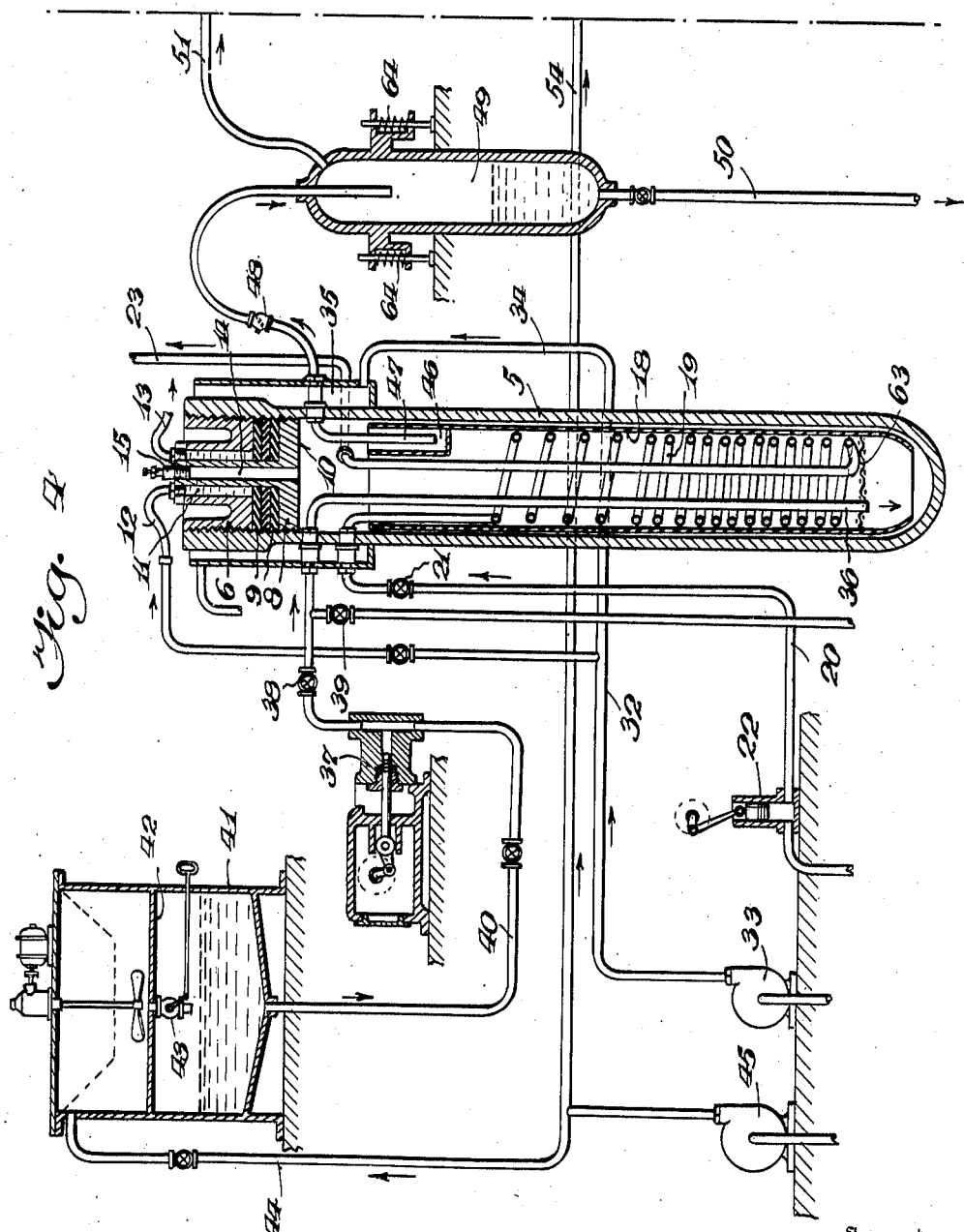

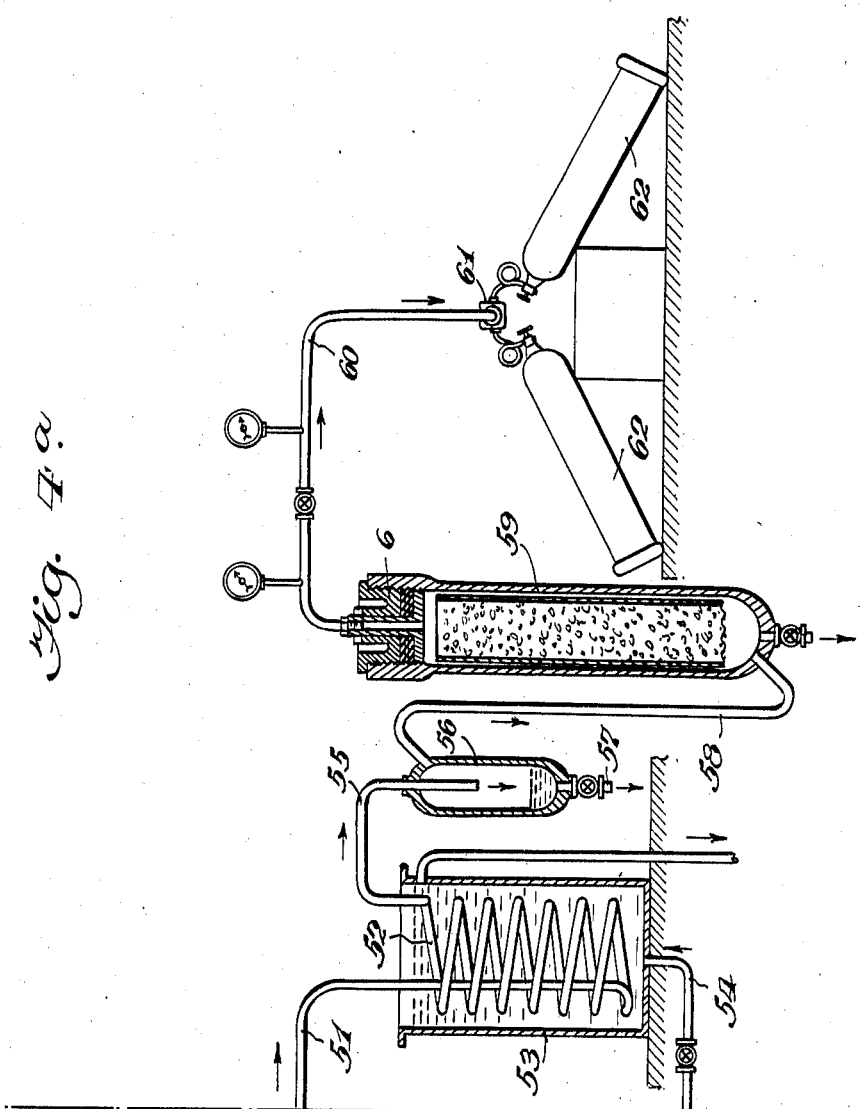

Patented Oct. 26, 1943

2,332,915

UNITED STATES PATENT OFFICE 2,332,915

PLANT FOR THE PREPARATION OF HYDROGEN UNDER PRESSURE

Georges François Jaubert, Paris, France; vested in the Alien Property Custodian

Application March 12, 1940, Serial No. 323,624
In France March 22, 1939

5 Claims. (Cl. 23—211)

This invention relates to an improved plant for the preparation of hydrogen which is to be used for instance for inflating balloons or the like. The plant is constructed for the storing of gas under very high pressure and is capable of producing such gas either continuously or intermittently.

It has already been proposed to discontinuously produce hydrogen by causing a mixture of ferro-silicon in the state of a powder to be acted upon by an aqueous solution of caustic soda, the reaction taking place in a strong receptacle. In such an arrangement when large quantities of hydrogen are to be obtained, it is necessary to use a receptacle having a very great volume in accordance with the quantity of gas to be obtained. Owing to the fact that the process for the preparation of hydrogen has a technical value only when the gas obtained is produced under a very high pressure, for instance 200 atm. per square centimeter, it is necessary to use very large receptacles which consequently are very heavy and difficult to transport.

The hydrogen generating plant is used where for instance the balloons are to be inflated, thus the plant is preferably mounted on a vehicle in order to render its transportation easier. It results that the weight of the generator has a very great importance, said weight having to be as small as possible. Said generator is constructed in the shape of a hollow cylinder the thickness of which increases more quickly than its diameter so that when it is desired to increase the capacity of the same, it is usual to build longer cylinders with a small diameter. Even when operating as hereabove indicated, the generators are very heavy, amounting to 1200–1500 kgs. for a generator of about 500 liters.

It has been proposed to cause said generators to swivel on their transporting carriage and to provide said generators with trunnions so that said generators may occupy a horizontal position during their transportation, and a vertical position when in operation for the production of hydrogen. With said devices it is necessary to dig a deep pit under the generator in order to accommodate the generator in a vertical position when in operation. It was consequently impossible heretofore to realize a portable apparatus or plant capable of producing large quantities of hydrogen and more especially capable of a continuous production, a problem the solution of which is a very important one for the inflation of balloons in the open country.

The plant according to this invention comprises in combination a convenient number of tubular generators of hydrogen in which the reaction of the convenient substances or products is to be effected, said generators being preferably fed by a common source of lye of soda and conveniently connected with a common collector for the reception of the gas generated and comprising besides a piping which allows same to be in communication with each other at the desired time of operation with a view to use the heat reaction of one or several generators producing hydrogen for preparing and starting the reaction of one or several other generators thus securing by a convenient working of the several generators the production of hydrogen at a desired pressure and in a continuous or discontinuous manner without having to bring external heat and with a highly reduced consumption of substances such as caustic soda which are used for the preparation of hydrogen.

According to this invention a wheeled carriage constituting an easily movable plant receives one, two, or a greater number of generators, preferably tubular in shape and having a small length, said generators being provided with a conveniently tight closure and receiving a charge of ferro-silicon which being attacked by water in presence of caustic soda produces hydrogen at the desired high pressure.

Figure 2:
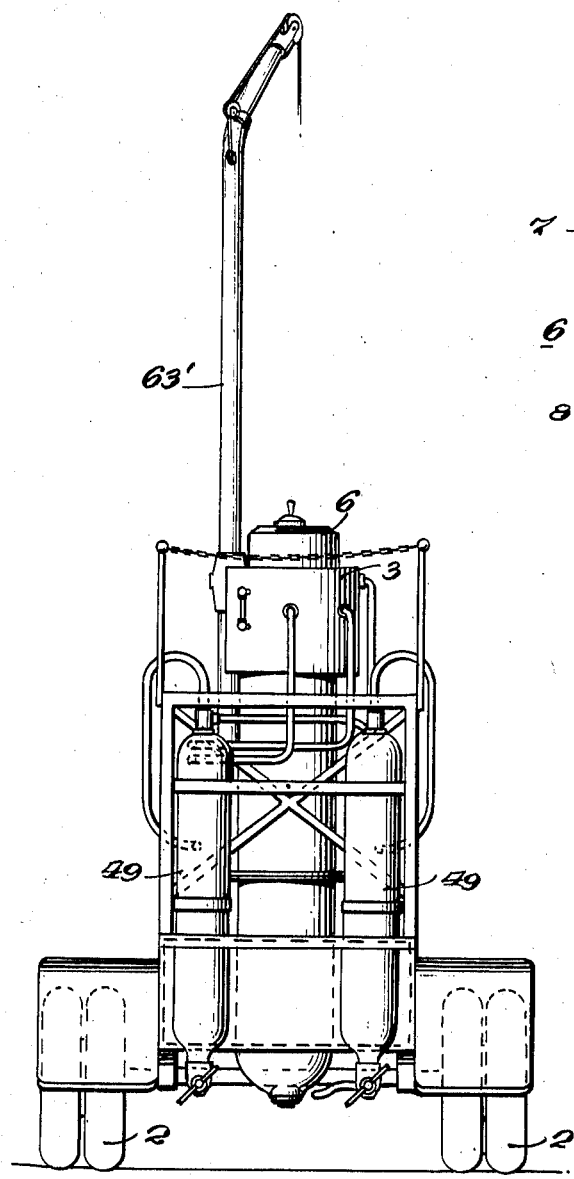
Figure 6:
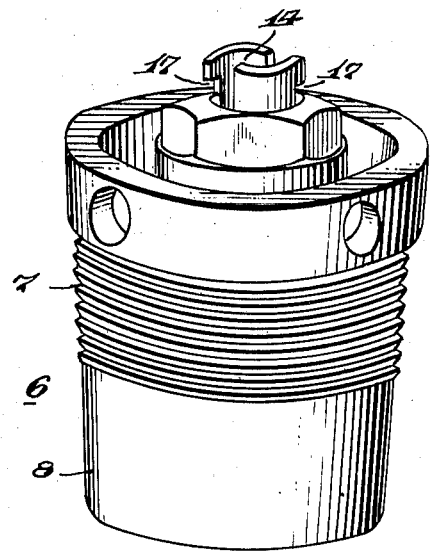
Figure 7:
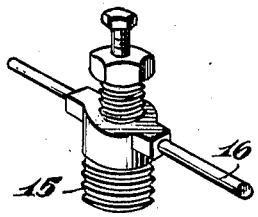

The accompanying drawings which show as a preferred embodiment of this invention a constructional form of the plant comprising two generators of hydrogen:

Figs. 1, 2 and 3 respectively show an elevation, a side view and a plan view of a simple form of a plant located on a transporting carriage, Fig. 4 is a schematic diagram, a single generator being shown in the figure in order not to complicate the drawing, Fig. 5 is a diagram showing the relative arrangement of both generators for what concerns the piping for cooling and heating same, Figs. 6 and 7 are detail views of the tight closing device for the generator.

The plant located on a frame 1 provided with wheels 2 for its easy transportation and thus allowing the production of hydrogen in the very place where the same is to be utilized is provided in this embodiment with two generators 3, 4; each of them (Figs. 1 and 4) comprising a tubular resistant receptacle 5, closed at its lower end, and the upper end of which is provided with a closure in the form of an obturator 6 constituted by a screw threaded member 7 (Fig.

6) having a movable head 8 which is provided with india-rubber washers 9 (Fig. 4) and a pad 10 which is directly submitted to the pressure which exists in the tubular receptacle 5.

Said pad is provided with a water jacket 11 having an inlet pipe 12 and an outlet pipe 13. The obturator together with its movable head is provided with a central conduit 14 closed at its upper end by means of a plug 15 (Fig. 7) which is also provided with the movable head and has a locking bar 16 which engages notches 17 (Fig. 6) provided at the upper end of said conduit 14, thus securing a perfectly tight closure of said conduit.

The tubular receptacle 5 is provided with a removable internal basket 18 which is to receive the ferro-silicon used for the production of hydrogen. The basket 18 together with the generator 5 is cooled by means of a tubular coil 19 in which circulating water is fed by means of a pipe 20 provided with a cock 21 connected with a pump 22. Said coil is provided with an outlet 23 (Figs. 4 and 5).

As shown in the diagram of Fig. 5, the outlet of coil 19a of generator 3 may be brought into communciation through the three-way cock 24 either with the open air by a tube 25 or with a conduit 26 connected through the three-way cock 27 with the conduit 20b feeding the coil 19b of the generator 4. Similarly the outlet 23b of coil 19b of the generator 4 may be brought into communication by means of a cock 28 with an outlet 29 or with a conduit 30 communicating by means of a cock 31 with a conduit 20a which feeds the coil 19a of generator 3.

The pipe 12 of the water jacket is connected with the delivery side 32 of a pump 33 which besides feeds through a pipe 34 a tank 35 constituting a water jacket for the head of the tubular receptacle 5 constituting each of the generators 3, 4.

In the tubular receptacles 5 ends the delivery pipe 36 (Fig. 4) of a pump 37, said pipe 36 comprising a valve 38 together with a draining cock 39. The pump 37 is connected through its suction side 40 with a tank 41 containing caustic soda and provided with a false bottom 42 with a cock 43 for the preparation of the solution of caustic soda. The water which is necessary for the preparation of said solution is fed to the tank 41 by the delivery pipe 44 of a pump 45.

The receptacle 5 which constitutes each of the generators 3, 4, is provided at its upper part with an overflow outlet 46 which receives a pipe 47 provided with a non-return valve 48 and arriving at the upper end of a draining tank 49 provided at the lower end with an emptying pipe 50 provided with a cock. A pipe 51 for the collection of hydrogen is connected with the upper part of the tank 49 and connected with a cooling coil 52 located in a tank 53 to which cooling water is brought by a pipe 54 fed by pump 45.

The tubular coil 52 is connected by a pipe 55 with a separating tank 56 provided with a draining pipe 57. A pipe 58 connects said separating tank 56 with a purifying tank 59 provided with an obturator similar with the one of the generator. Said purifying tank 59 is connected by a pipe 60 with a filling collector 61 for tanks or other receptacles 62 and having any desired arrangement.

The operation is as follows:

The closure 6 of each of generators 3, 4 having been opened, one of said generators, for instance generator 4, receives the desired charge of ferro-silicon broken into fragments of convenient size, said charge being carried by an intermediate perforated bottom 63 (Fig. 4) of the basket 18 in order to leave a space between the same and the bottom of the receptacle 5. The closure of said generator is afterwards secured in its position.

The lower part of basket 18 of generator 3 receives a mixture of powdered ferro-silicon and caustic soda (for instance caustic soda of the trade in flakes) which charge is covered by fragments of ferro-silicon. The obturating cover of said generator 3 is then put into its closing position and the quantity of water necessary for the starting of reaction is poured into the generator through the central conduit 14, the obturator 15 (Figs. 4 and 7) being afterwards put into its closing position. The reaction starts after a very short time thus producing considerable heating while hydrogen is generated inside the receptacle. Once the reaction is started, the cock 38 of the delivery side of pump 37 for the caustic soda is opened, said pump having been put into operation for forcing said caustic soda into the generator 3.

The pump 22 which forces cold water into the tubular coil 19 keeps a convenient temperature inside receptacle 5 as well as in basket 18, the steam which is formed in the coil 19 during said cooling being vented into the open air through the three-way cock 24 which connects the pipe 23 of the outlet of coil 19a (Fig. 5) with the tube 25.

The generated hydrogen together with the liquid contained inside the tank 5, passes through pipe 47 into the draining tank 49, the liquid carried with the hydrogen collecting into the lower part of said tank, while the hydrogen is cooled in the tubular coil 52 before entering the separator 56. The steam carried by the hydrogen and which is condensed inside the coil 52 collects in the lower part of separator 56 and the hydrogen is afterwards delivered into the collector 61 for feeding tubes 62 after having passed through the chemical purifying tank 59.

After a while when the ferro-silicon contained in the generator 3 is almost exhausted—which is easily determined by the duration of operation—the cock 24 is closed, the discharging pipe 23 of the coil 19a is connected with pipe 20b by cock 27 which thus allows the steam formed in the tubular coil 19a to pass into the tubular coil 19b of the generator 4. The cock 28 is brought into a convenient position for causing the discharge pipe 23b of the coil 19b to communicate with the outlet 29, the operation being conveniently managed so that when the ferro-silicon contained in the generator 3 is completely exhausted the temperature of the generator 4 has attained a convenient value for securing the starting of the reaction and the immediate production of hydrogen in said generator when the same is fed with a solution of caustic soda.

The production of hydrogen is then occurring within the generator 4, while the generator 3 is turned off to allow the same to be recharged with ferro-silicon. Said charge is operated by using the crane 63' (Fig. 1). When the ferro-silicon of generator 4 is exhausted, the generator 3 is again brought into operation, the manoeuvre described here-above being effected for generator 3, and the described operation proceeds without any interruption in a practically continuous manner, the generator being alternately recharged with ferro-silicon as required, the solution of caustic soda which is necessary for the production of hydrogen being prepared according to the need in the tank 41 without interrupting the operation of the whole apparatus.

The draining tank 49 is spring mounted as at 64 (Fig. 4). A convenient sounding or other alarm device being located on said tank in order to let the operator know when the quantity of liquid collected in the lower part of said tank attains a conveniently predetermined value, necessitating the emptying of same. A gauge-glass could also be provided on said tank for letting the operator know when the tank 49 should be drained. Indicating apparatus could also be provided on the separator 56 as well as on purifier 59.

The several pumps may be provided with corresponding motors for the operation of same, or they could be also controlled by a common motor if desired.

The invention applies for the production of gaseous hydrogen for any use and more particularly for the production of hydrogen designed for filling up storage tubes designed for inflating balloons or even for the direct inflating of said balloons on the very spot where said inflating has to take place.

What I claim is:

1. In an improved plant for the preparation of hydrogen under high pressure, a platform, at least one generator mounted on said platform, cooling means within the generator, a removable container within the generator, a tight closure for said generator, an inlet communicating with the generator and feeding at the bottom thereof, valve controlled outlet means near the top of the generator, a filter associated with the outlet means and means for regulating the flow of fluid through the cooling means in response to a stated rise in temperature for ensuring the obtention of high pressured hydrogen from the plant.

2. In an improved plant for the preparation of hydrogen under high pressure, a platform, at least one generator mounted on said platform, a removable container within the generator, a cooling jacket within the generator, a tight closure for said generator, a pump adjacent said generator, a supply tank connected to the suction side of said pump, a pipe extending from the delivery side of said pump and communicating with said generator, outlet means near the top of the generator, a filter associated with the outlet means and means for regulating the flow of fluid through the cooling jacket in response to a stated rise in temperature for ensuring the obtention of high pressured hydrogen from the plant, and means for holding the generated hydrogen at a high pressure and for releasing the hydrogen comprising valve means in the outlet means.

3. In an improved plant for the preparation of hydrogen under high pressure, a platform, at least one generator mounted on said platform, a removable container within the generator, a tight closure for said generator, a pump adjacent said generator, a supply tank connected to the suction side of said pump, a pipe extending from the delivery side of said pump and communicating with said generator, a water jacket in the form of a tubular coil within the generator and positioned in close proximity to the wall thereof, valve controlled outlet means near the top of the generator, filter means associated with said outlet means, and means for regulating the flow of cooling fluid through the cooling jacket in response to a stated rise in temperature.

4. In an improved plant for the preparation of hydrogen under high pressure, a platform, at least one vertical generator mounted on said platform, cooling means within the generator, a removable basket within the generator, a tight closure for said generator, an inlet pipe communicating with the generator at the top thereof and extending downwardly into the basket and feeding at the bottom thereof, a valve controlled outlet pipe near the top of the generator, a filter associated with the outlet pipe and means for regulating the flow of fluid through the cooling means in response to a stated rise in temperature for ensuring of the obtention of high pressured hydrogen from the plant.

5. In an improved plant for the preparation of hydrogen under high pressure, a platform, a plurality of generators mounted on said platform, removable containers within the generators, a tight closure for each of said generators, a pump adjacent the generators, a supply tank connected to the suction side of said pump, pipes extending from the delivery side of said pump and communicating with each generator, a tubular coil constituting a water jacket inside each generator and located in close vicinity to the wall thereof, a valve controlled piping optionally connecting the water jackets of each generator to each other or to the open air, outlet means near the top of each generator, filter means associated with the said outlet means, and means for regulating the flow of cooling fluid through the cooling jackets in response to a stated rise in temperature and means for holding the generated hydrogen at a high pressure and for releasing the hydrogen comprising valve means in the outlet means.

GEORGES FRANÇOIS JAUBERT.